(12) United States Patent
Theusner

(10) Patent No.: US 9,221,060 B2
(45) Date of Patent: Dec. 29, 2015

(54) METHOD FOR PROCESSING RUBBER GRANULES OR RUBBER POWDERS

(71) Applicant: Continental Reifen Deutschland GmbH, Hannover (DE)

(72) Inventor: Martin Theusner, Gehrden (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 13/857,015

(22) Filed: Apr. 4, 2013

(65) Prior Publication Data

US 2013/0225766 A1    Aug. 29, 2013

Related U.S. Application Data

(63) Continuation of application No. PCT/EP2011/064871, filed on Aug. 30, 2011.

(30) Foreign Application Priority Data

Oct. 15, 2010    (EP) .................................... 10187736

(51) Int. Cl.
| | |
|---|---|
| B29B 17/02 | (2006.01) |
| B02C 23/08 | (2006.01) |
| C08L 7/00 | (2006.01) |
| C08L 23/22 | (2006.01) |
| C08L 23/28 | (2006.01) |
| B29K 7/00 | (2006.01) |
| B29K 21/00 | (2006.01) |
| B29K 705/12 | (2006.01) |
| B29L 30/00 | (2006.01) |

(52) U.S. Cl.
CPC ................. *B02C 23/08* (2013.01); *B29B 17/02* (2013.01); *C08L 7/00* (2013.01); *C08L 23/22* (2013.01); *C08L 23/283* (2013.01); *B29B 2017/0203* (2013.01); *B29B 2017/0248* (2013.01); *B29B 2017/0268* (2013.01); *B29K 2007/00* (2013.01); *B29K 2021/00* (2013.01); *B29K 2705/12* (2013.01); *B29L 2030/00* (2013.01); *Y02W 30/622* (2015.05); *Y02W 30/68* (2015.05)

(58) Field of Classification Search
CPC ............ B29B 17/02; B29B 2017/0203; B29B 2017/0248; B02C 23/08
USPC ................ 241/14, 20, DIG. 31; 521/40.5, 41; 528/931
See application file for complete search history.

(56) References Cited

U.S. PATENT DOCUMENTS

| | | | | |
|---|---|---|---|---|
| 1,195,264 | A | * | 8/1916 | Pennington .................... 209/166 |
| 2,462,645 | A | * | 2/1949 | Knowland .................. 241/24.17 |
| 4,200,359 | A | * | 4/1980 | Lawson ........................ 359/850 |
| 4,352,735 | A | | 10/1982 | Turetsky |
| 5,482,215 | A | | 1/1996 | Veres |
| 6,655,167 | B2 | | 12/2003 | Kantonen et al. |
| 2010/0133295 | A1 | * | 6/2010 | Chan et al. ..................... 222/95 |
| 2011/0159982 | A1 | * | 6/2011 | Takeuchi ...................... 473/299 |

FOREIGN PATENT DOCUMENTS

| | | |
|---|---|---|
| EP | 1 031 440 A2 | 8/2000 |
| WO | WO 94/07670 A2 | 4/1994 |

OTHER PUBLICATIONS

International Search Report dated Nov. 25, 2011 of international application PCT/EP2011/064871 on which this application is based.

* cited by examiner

*Primary Examiner* — Nathan M Nutter
(74) *Attorney, Agent, or Firm* — Walter Ottesen P.A.

(57) ABSTRACT

A method for processing rubber granules or rubber powders containing different types of rubber. Vehicle tires containing natural rubber in the tread and butyl rubber in the inner liner are granulated or ground to prepare rubber granules or rubber powders, which are processed in a flotation cell under stirring and with the addition of air. The natural rubber fraction of the rubber granules has a higher tendency to adsorb air bubbles and to rise in the flotation cell, while the butyl rubber fraction remains at the bottom. The rubber granules are separated into two or more rubber fractions with an increased amount of a specific rubber type in each fraction.

12 Claims, 7 Drawing Sheets

METHOD FOR PROCESSING RUBBER GRANULES OR RUBBER POWDERS

CROSS REFERENCE TO RELATED APPLICATIONS

This application is a continuation application of international patent application PCT/EP2011/064871, filed Aug. 30, 2011, designating the United States and claiming priority from European application 10187736.3, filed Oct. 15, 2010, and the entire content of both applications is incorporated herein by reference.

FIELD OF THE INVENTION

The invention relates to a method for processing granulated rubbers or powdered rubbers containing different rubber types and to the use of the granulated rubber or powdered rubber processed by the method.

"Processing" refers to the treatment, of substances or substance mixtures, this generally serving to enrich desirable components. Processing methods are therefore generally separation methods.

BACKGROUND OF THE INVENTION

Every year, many millions of tons of used tires accrue globally, of which, about 25% are utility vehicle tires. In Europe alone, about 3.2 million tons of used tires accrue per year, the proportion of used utility vehicle tires being about 0.8 million. A large portion of the used tires is utilized for energy purposes in the cement industry, and is thus no longer available for a further physical utilization, in the face of increasing raw material scarcity.

To date, there are only very limited means of physical utilization for used tire material in the form of granules or powder in mixtures for new tires. The most important physical utilization is the use of granulated rubber or powdered rubber produced from used tires, also called ground rubber, of various particle sizes in rubber mats or other dynamically unstressed rubber products.

In the production of granulated rubber or powdered rubber from utility vehicle tires, there are basically two different products:

The first product is the granulated/ground whole tire material. Since the whole tire is granulated/ground, it contains all the tire mixtures in a tire from the inner airtight butyl- or halobutyl-containing inner liner mixture up to the tread made from natural rubber. In order to keep the air pressure in the tire constant over a long period, all tires have an inner liner mixture comprising predominantly butyl rubber, chloro rubber or bromobutyl rubber as the rubber. If the whole tire is comminuted and ground, the granules or powder always also contain the inner liner mixture. Large amounts of this material are supplied on the market, and some is used as a filler in asphalt.

A further type of granulated/ground tire material which is produced to a very limited degree consists of shaved-off treads and sidewalls of reconditioned utility vehicle tires. This material consists almost exclusively of natural rubber.

The known granulated rubbers or powdered rubbers from utility vehicle tires can be added as an aggregate in small amounts to freshly produced tire mixtures in tire production. However, the use thereof is very limited in terms of amount, since the granulated tire particles act like small foreign bodies in the fresh tire mixture. Among other causes for this behavior, one is that the strength and extension of the granulated used tires differ significantly from those of the fresh mixture after vulcanization in the tire mixture. Vulcanization then vulcanizes the granulated tire particles for a second time in the new product. The first vulcanization of the granulated tire material was already conducted in the used tire, the starting material for the granulated tire material. The used tire particles which have now been vulcanized for the second time show a difference in the strength/extension characteristics at the interface to the fresh tire mixture, which can adversely affect dynamic performance. In many rubber products which are not subject to dynamic stress, for example rubber mats, stands for mobile traffic signs for roadworks sites or inclined sidewalk ramps, it is possible to add granulated tire material or else granules of other rubber products to the fresh mixtures because there is no dynamic stress as in tires in this case.

In order nevertheless to enable high-value utilization of granulated used tires for use in tires, it is known and customary to regenerate this granulated material. In a regeneration process, the vulcanized granulated tire material is plasticized, meaning that it is converted from the elastic state to a plastic state, by degrading the rubber chains and the sulfur bridges formed by the vulcanization.

Numerous processes for regeneration or devulcanization of vulcanized granulated/ground tire material are being employed. All processes have the aim of regenerating, that is, splitting up, the crosslinking structure. The effect of thermal and mechanical energy in roll mills or in mixers, with the aid of different polymer chain-degrading and sulfur bridge-degrading chemicals, depolymerizes the molecules of the vulcanized granulated/ground used tire material, and also degrades sulfur bridges. This operation is generally referred to as regeneration.

The now plastic product which arises in the processes and has a defined viscosity is available on the market as a regenerated material for various additions to tire mixtures and industrial rubber mixtures, and shows the adverse properties of unregenerated granulated/ground tire material in dynamically stressed products to a distinctly reduced degree.

However, the butyl, chloro or bromobutyl rubber components present still have an adverse effect in the granulated or powdered material.

Because of their molecular structure, these granules of butyl, chloro or bromobutyl rubber show incompatibility when mixed/blended with natural rubber and other rubber types in freshly produced mixtures of natural and synthetic rubbers. They form domains of undistributed butyl and halobutyl rubber. As shown by studies and experience from the tire industry, these rubber types act like a separation layer in the mixture, which can lead to distinct shortcomings in performance in the product. These rubbers are very difficult to homogenise in mixtures with other rubbers, for example natural rubber, and their chemical constitution leads to poor binding in fresh mixtures.

This adverse behavior of the mixtures with butyl and halobutyl rubber, for example the inner liner mixtures, is well known in the tire industry and limits the use of regenerated material from granulated rubber or powdered rubber from whole utility vehicle tires as a valuable mixture addition to a considerable degree. A considerably greater use of natural rubber-containing regenerated material from granulated/ground whole utility vehicle tire material would therefore be possible if the proportions of the butyl, chloro or bromobutyl rubbers from the material could be reduced prior to the regeneration process.

Also in the case of granulated rubbers and powdered rubbers which are produced from used rubber products other than tires, there may be incompatibilities in reutilization in the case that several rubber types are present in the rubber product.

SUMMARY OF THE INVENTION

It is therefore an object of the invention to provide a simple and efficient method for processing granulated rubbers or powdered rubbers containing different rubber types. In the method, granulated rubbers or powdered rubbers are to be separated from rubber mixtures comprising different rubber types. The object is achieved in accordance with the invention by effecting the processing by means of flotation.

It has been found that, surprisingly, granulated rubbers or powdered rubbers whose particles are based on different rubber types can be separated by the simple method of flotation.

DETAILED DESCRIPTION OF THE INVENTION

Flotation is the separation process, also referred to as float processing, for processing of ground, fine particulate and granulated solids on the basis of the different surface wettability of the granules/particles. This exploits the fact that air bubbles having bubble sizes of 0.05 to 1 mm accumulate more easily on some granules/particles than others and impart buoyancy to the particles in the suspension. Particles on which no bubbles accumulate fall to the bottom in what is called the flotation cell. Adhesion phenomena, for example those of the electrochemical double layer and of van der Waals forces, are involved at the interfaces, and these influence the adhesion of the bubbles on the surface of the solids. If granules containing several rubber types within one particle are present, the rubber which offers a greater proportion of the area for the accumulation of bubbles is dominant in terms of surface wettability.

Flotation is known from the processing of ores, coal, salts or wastewater. BP 1 031 440 A2 and U.S. Pat. No. 6,655,167 B2 mention it in connection with the recycling of rubber wastes for removal of metallic and textile reinforcing elements from rubber. The separation of different rubber types is not mentioned therein.

The processed granulated rubbers or powdered rubbers obtained by the process open up the possibility of reusability of the valuable raw materials from used rubber products. At the same time, a considerable contribution is made to conserving the environment, since the rubber types removed can be utilized wore effectively and several times for a long period. The incineration of valuable used rubber products can thus be avoided.

The process according to the invention can preferably be used for processing of granulated rubber or powdered rubber comprising natural rubber and butyl rubber (IIR) or halobutyl rubber (XIIR). The halobutyl rubbers are especially bromobutyl or chlorobutyl rubber. These rubber types can be separated efficiently from one another by the process according to the invention, one reason for which could be a higher surface roughness observed by microscopy in the natural rubber-containing granules compared to the butyl rubber-containing granules, and another could be a different chemical constitution of the rubbers. It was found that the natural rubber-containing particles exhibit intensive, selective accumulation of air bubbles and float in the course of flotation, while the butyl rubber-containing particles accumulate barely any or no air bubbles and therefore do not float.

The separation of natural rubber and butyl rubber (IIR) or halobutyl rubber (XIIR) having incompatibilities with one another is thus enabled. To date, it has been possible to obtain granulated material having only a low level of butyl/halobutyl rubber or none at ail in only small amounts from used utility vehicle tires on reconditioning by shaving off the treads and/or the sidewall (natural rubber mixtures). It is now possible in accordance with the invention to obtain, on an industrial scale, granulated rubber or powdered rubber free of/low in butyl/halobutyl rubber, for example from granulated whole utility vehicle tire material, as a starting material for a regeneration process, and then to use it for further rubber products.

The granulated butyl or halobutyl rubber removed can likewise be subjected to a regeneration process and be used as regenerated material in the fresh mixtures, for example in tire production.

This conserves natural rubber resources, which are limited even now, but also those of the butyl/halobutyl rubber removed. Moreover, the costly and environmentally polluting transport of natural rubber from South-East Asia is reduced.

The method according to the invention can be performed with granulated rubber or powdered rubber from a wide variety of different rubber products. In a preferred, development of the invention, the granulated rubber or powdered rubber has been obtained by comminuting whole used tires. In this way, the used, tires which accrue globally can be sent to a reutilization which conserves the environment and resources. Mechanical removal of the inner liner mixture from, used, tires, for example, by grinding it out, is unnecessary since the various rubber types in the tire which can be troublesome in the course of further utilization can be separated by the process according to the invention.

The process according to the invention additionally offers the possibility of also removing steel cord fragments which have not been removed beforehand by metal, separators in the course of granulation of used tires, in the flotation cells. The non-foaming granules can then also be passed once again through a metal separator to separate out any steel cord fragments present. This affords a particularly high-value granulated material, for example granulated butyl rubber, for a subsequent regeneration process. The material is improved for further use in rubber mixtures.

The used tires used may be automobile tires. However, preference is given to using used utility vehicle tires (used truck tires), which are ground in large grinding plants to give granules and ground materials of a wide variety of different particle sizes and are supplied an the market in large volumes. The granules or powder of used utility vehicle tires is particularly suitable for the method according to the invention, since the tread and possibly other tire components—excluding the inner liner—in used utility vehicle tires are generally based nearly 100% on natural rubber, and the inner liner is based on butyl/halobutyl rubber, and these rubber types can be separated particularly efficiently in accordance with the invent ion.

In a further development of the invention, the granulated rubber or powdered rubber has a particle size of 50 to 3 mesh, corresponding to a mesh size of 0.3 to 6.73 mm. It is advantageous when the material to be processed does not result in mechanical interlocking of bubbles owing to the structure of the particles, and the bubbles instead accumulate on the basis of the different interracial tensions.

The method according to the invention can be performed, for example, in stirred cells, in which case the cells are referred to as flotation cells.

The processing is preferably effected in at least one flotation cell. However, it is also possible to connect several flotation cells in series in order to further improve the separation of the granulated rubber or powdered rubber.

The media used for suspension of the granulated rubber or powdered rubber in flotation may be different liquids. For the flotation, the granulated rubber or powdered rubber is preferably suspended in water as an environmentally friendly medium. In this medium, the granulated rubbers or powdered rubbers comprising different rubber types can be processed efficiently.

For the flotation, the gases used may be a wide variety of different gases. However, it is particularly inexpensive and simple to use air as the gas for the flotation.

The wettability of the particles to be separated can be influenced by additions of flotation agents. Flotation agents are understood to mean chemicals which either improve the wettability of the different material surfaces (called collectors), control the selectivity thereof (flotation control agents, namely what are called depressors, activators, pH regulators, dispersants and flocculants) or bring about or improve foam formation (foamers). The foamers used may, for example, be conventional surfactants.

If a plurality of flotation cells are connected in series, flotation cells with and without flotation agents can be combined. In the exemplary embodiment of FIG. 7, no flotation agent is used in the first flotation cell and a flotation agent is provided in the second flotation cell.

In order to prepare the processed granulated rubber or powdered rubber for further processing or transport, it has been found to be advantageous to dry the processed granulated rubber or powdered rubber, for example, with a hot air blower.

The processed granulated rubber or powdered rubber can be comminuted, further or ground prior to further use or prior to regeneration.

To improve the properties of the processed and dried granulated rubber or powdered rubber when reused in rubber produces to be vulcanized, it is preferably regenerated. This can be effected by the action of thermal or mechanical energy in roll mills or in mixers, and with the aid of different polymer chain- or sulfur bridge-degrading chemicals.

The processed granulated rubber or powdered rubber can be used either in crude form or in regenerated form as an aggregate for rubber mixtures for a wide variety of different rubber products, including industrial rubber products such as rubber mats, conveyor belts, shoe soles or hoses. It is preferably used in tire rubber mixtures.

BRIEF DESCRIPTION OF THE DRAWINGS

The invention will now be described with reference to the drawings wherein.

DESCRIPTION OF THE PREFERRED EMBODIMENTS OF THE INVENTION

Tests were conducted in different flotation cells with particles of natural rubber and butyl/halobutyl rubber under different conditions with air as a flotation gas in the suspension medium water.

In all tests, it was found that some particles accumulate the air bubbles and foam up, while other particles did not accumulate any air bubbles and remained on the bottom of the flotation cells.

Figure 1:
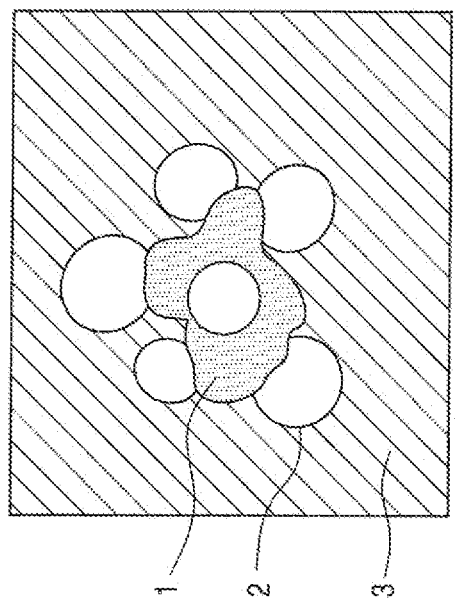
FIG. 1 is a schematic of the accumulation of air bubbles on hydrophobic granulated used tire material from utility vehicle tires.

FIG. 1 shows an enlargement of a granulated used tire particle 1 with accumulated air bubbles 2 in suspension medium 3.

Test 1

Figure 2:
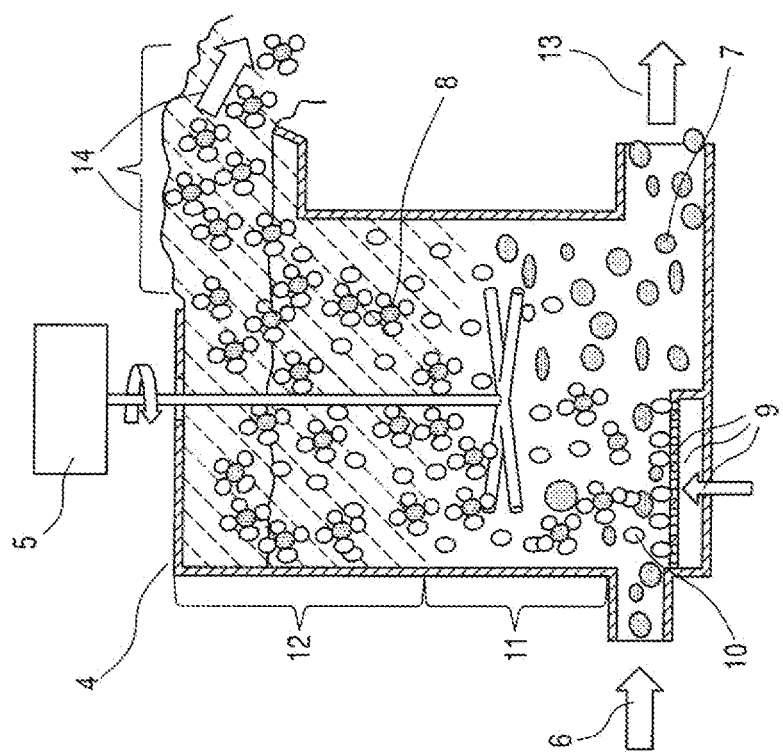
FIG. 2 is a schematic of a flotation cell with a perlator for processing of granulated rubber.

A granulated whole utility vehicle tire material available on the market, comprising natural rubber and butyl/halobutyl rubber having a particle size of 2 to 4 mm, was processed in a flotation cell 4 according to FIG. 2. For this purpose, the flotation cell 4 having a capacity of approx. 2 l was provided with an electrically driven stirrer 5 with DC motor. The rotation speed of the stirrer 5 was regulated variably by means of a transformer (230 V AC voltage/0-14 V DC). The rotation speed of the stirrer 5 was adjusted such that the granulated whole truck tire material (7, 8) floated via a tube 6 by means of a water flow of 2-4 l/min was dispersed homogeneously in the flotation cell 4.

Commercial surfactants in a concentration of 0.1% by volume to 0.01% by volume were added to the water as foamers for discharge of the granules which accumulate air bubbles. The foam stability was sufficient and had enough load-bearing ability to discharge the granules 8 which accumulate air bubbles out of the flotation cell 4 at the top.

By means of a perlator 9, the air was blown in at flow rates between 1.8 and 4.5 l/min. The upward motion of the water generated by the ascending air bubbles 10 acted on the granulated material 8, and it was fluidized homogeneously in the bubble accumulation zone 11 by the stirrer 5. The granulated material 8 which accumulates air bubbles 10 rose, by virtue of the accumulated bubbles, upward into the zone of foam formation 12. The granulated material 7 which did not accumulate any air bubbles 10 was drawn off from the flotation cell 4 via a tube 13 with a regulatable flow rate. The ascending foam acted on the granulated material 8 with accumulated air bubbles 10, and the granulated material left the flotation cell 4 therewith at the top in the region 14. By means of a simple slide valve, it was possible to introduce the foam into a receiver. With a simple water jet, it was possible to remove the foam and to add the surfactant-containing water proportionately to the water for introduction of the granule mixture (7, 8). The granulated material 8 obtained from the foam and the granulated material 7 removed from the base of the flotation cell 4 were dried and analyzed by means of IR spectroscopy. An IR spectrum of the starting material was also recorded.

Figure 3:
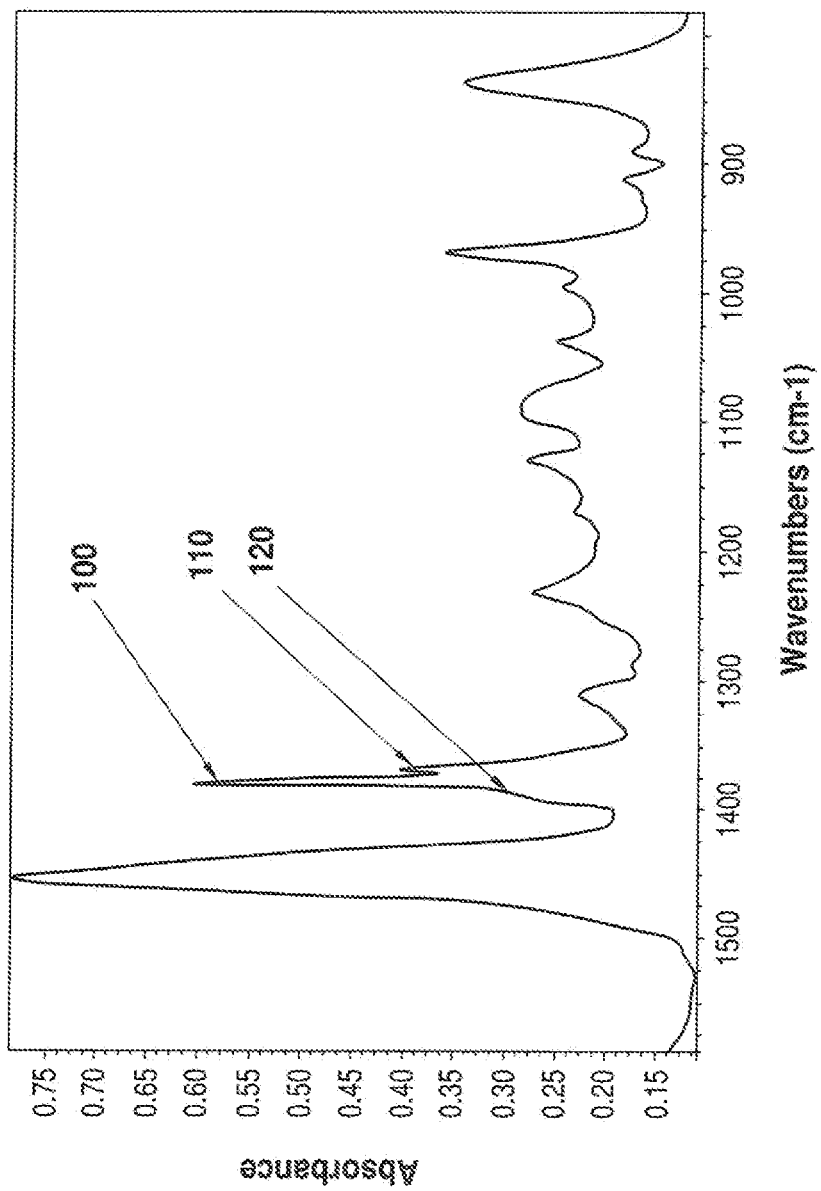
FIG. 3 is an IR spectrum of granulated whole utility vehicle tire material as the starting material.

FIG. 3 shows the IR spectrum of the granulated whole utility vehicle tire material (7, 8) as the starting material. The peak 100 at about 1370 cm$^{-1}$ is the peak which, is caused by the natural rubber component. The butyl rubber component is revealed by the peak 110 at about 1360 cm$^{-1}$ with the accompanying shoulder 120 at about 1380 cm$^{-1}$. The peak area of the butyl rubber corresponds to a butyl rubber component of about 10 phr. The unit phr (parts per hundred parts of rubber by weight) used in this disclosure is the standard way of stating amounts for mixture formulations in the rubber industry. The dosage of the parts by weight of the individual substances is always based on 100 parts by weight of the overall mass of all rubbers present in the mixture.

Figure 4:
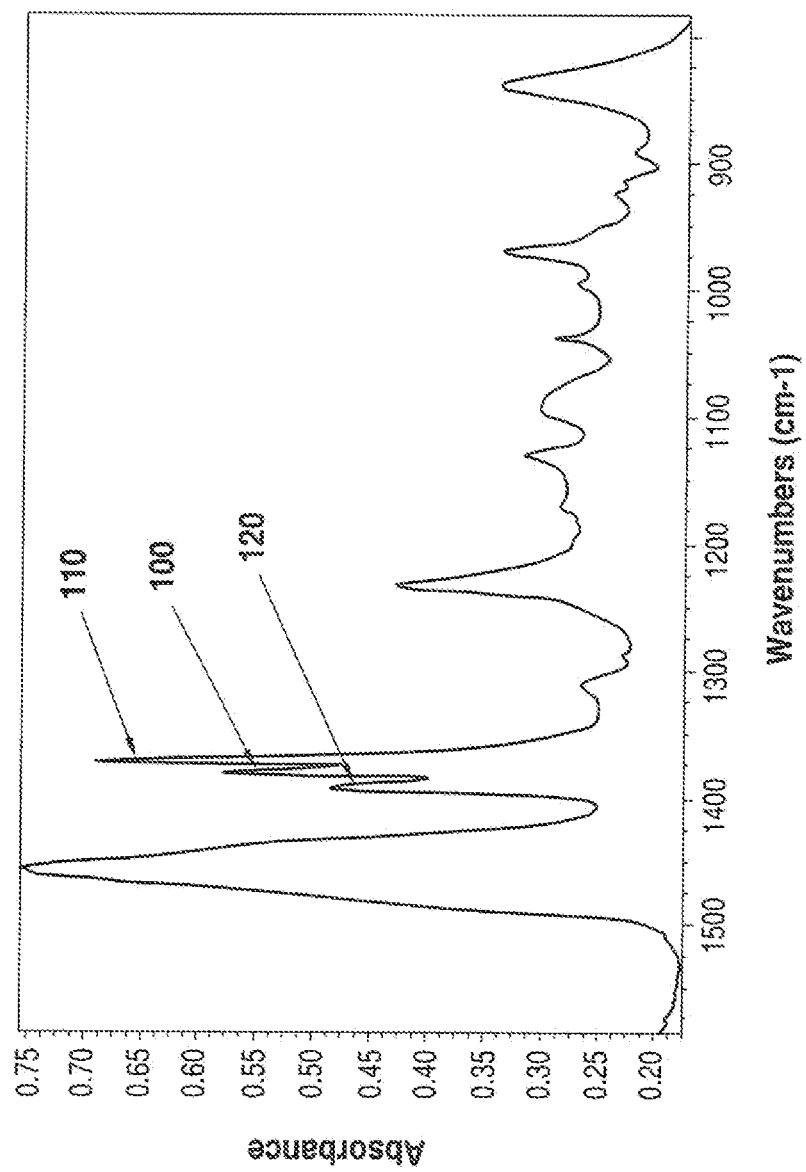
FIG. 4 is an IR spectrum of granules remaining in the flotation cell.

FIG. 4 shows the IS spectrum of the granulated material 7 remaining in the flotation cell 4. It becomes clear from this spectrum that this is a granulated material distinctly enriched in butyl rubber and depleted of natural rubber. The natural rubber peak 100 has become smaller and the specific butyl rubber peaks 110 and 120 have risen significantly, now corresponding to a butyl rubber content of more than 20 phr.

Figure 5:
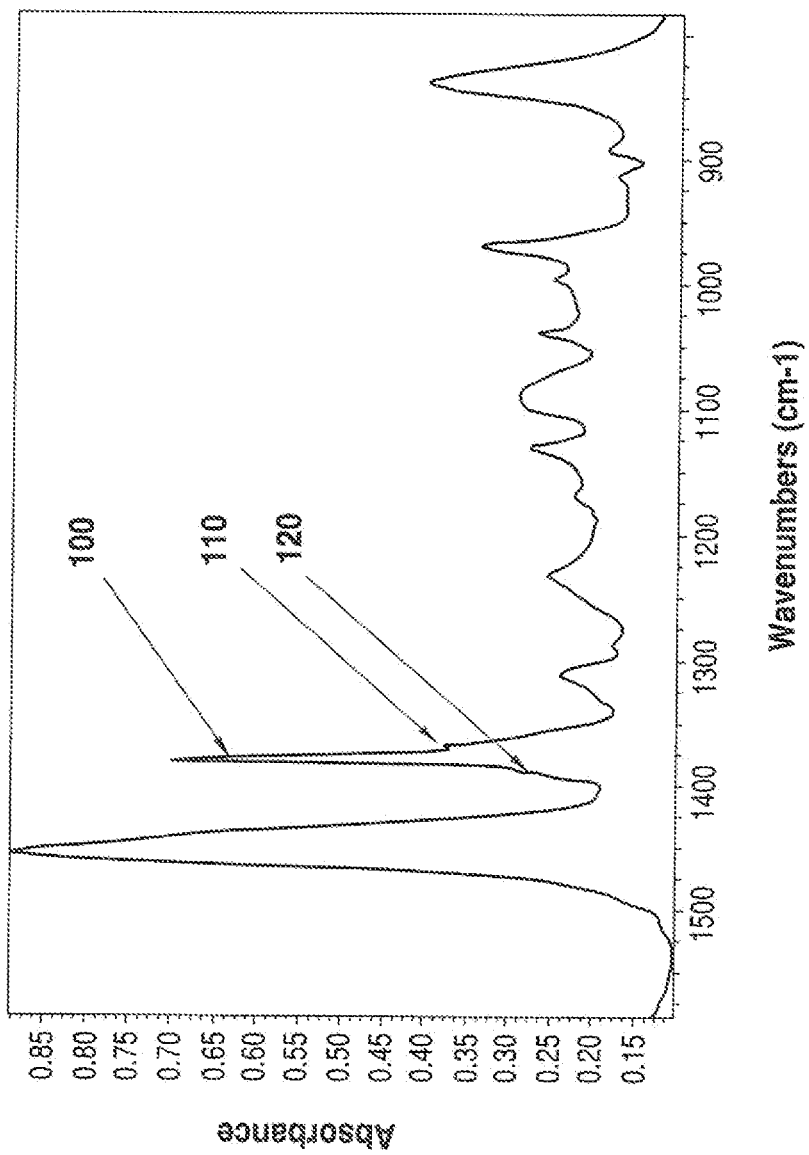
FIG. 5 is an IR spectrum of foamed granules.

FIG. 5 shows the IR spectrum of the foamed granulated material 8. The peak 100 which is characteristic of the natural rubber has become much larger compared to the starting material as per FIG. 3, and the peaks 110 and 120 for the butyl rubber have become much smaller, corresponding to a butyl rubber content of less than 5 phr.

The three IR spectra demonstrate that it has been possible through the test conducted by the method according to the invention to process a granulated whole tire material which comprised natural rubber and butyl/halobutyl rubber and to separate the rubber types from one another. The granulated material 8 which accumulated air bubbles and was foamed comprised more natural rubber. The granulated material 7 which accumulated no air bubbles and remained at the base of the flotation cell 4 contained more butyl/halobutyl rubber.

The fact that the granulated material which accumulates air bubbles is the granulated material having a high natural rubber content was also demonstrated in a simple test, in which a pure natural rubber mixture produced in the laboratory, after vulcanization, was cut into small cubes of edge length about 4-5 mm. At the same time, a butyl/halobutyl rubber mixture produced in the laboratory (halobutyl rubber content>80 phr), after vulcanization, was cut into small triangles of edge length about 4-5 mm and thickness 4 mm. The triangles and squares were mixed and used to conduct a flotation test analogously to test 1. The cubes comprising natural rubber accumulated air bubbles and floated. The triangles comprising butyl/halobutyl rubber did not accumulate any air bubbles and remained on the bottom of the flotation cell.

Test 2

Figure 6:
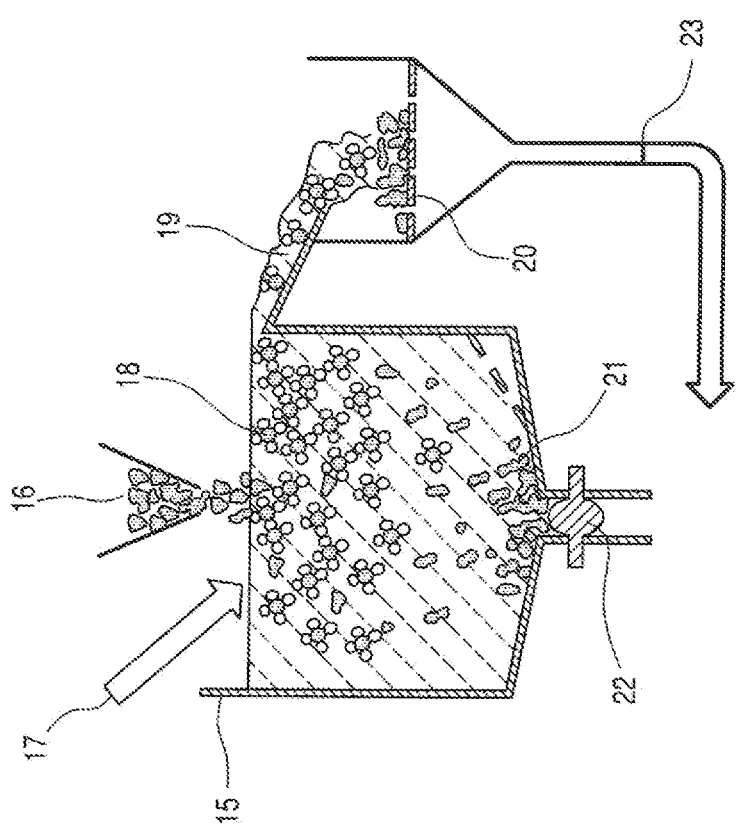
FIG. 6 is a schematic of a flotation cell with an injected air-containing water jet for processing of granulated rubber; and, FIG. 7 is a schematic of two flotation cells connected in series.
Figure 7:
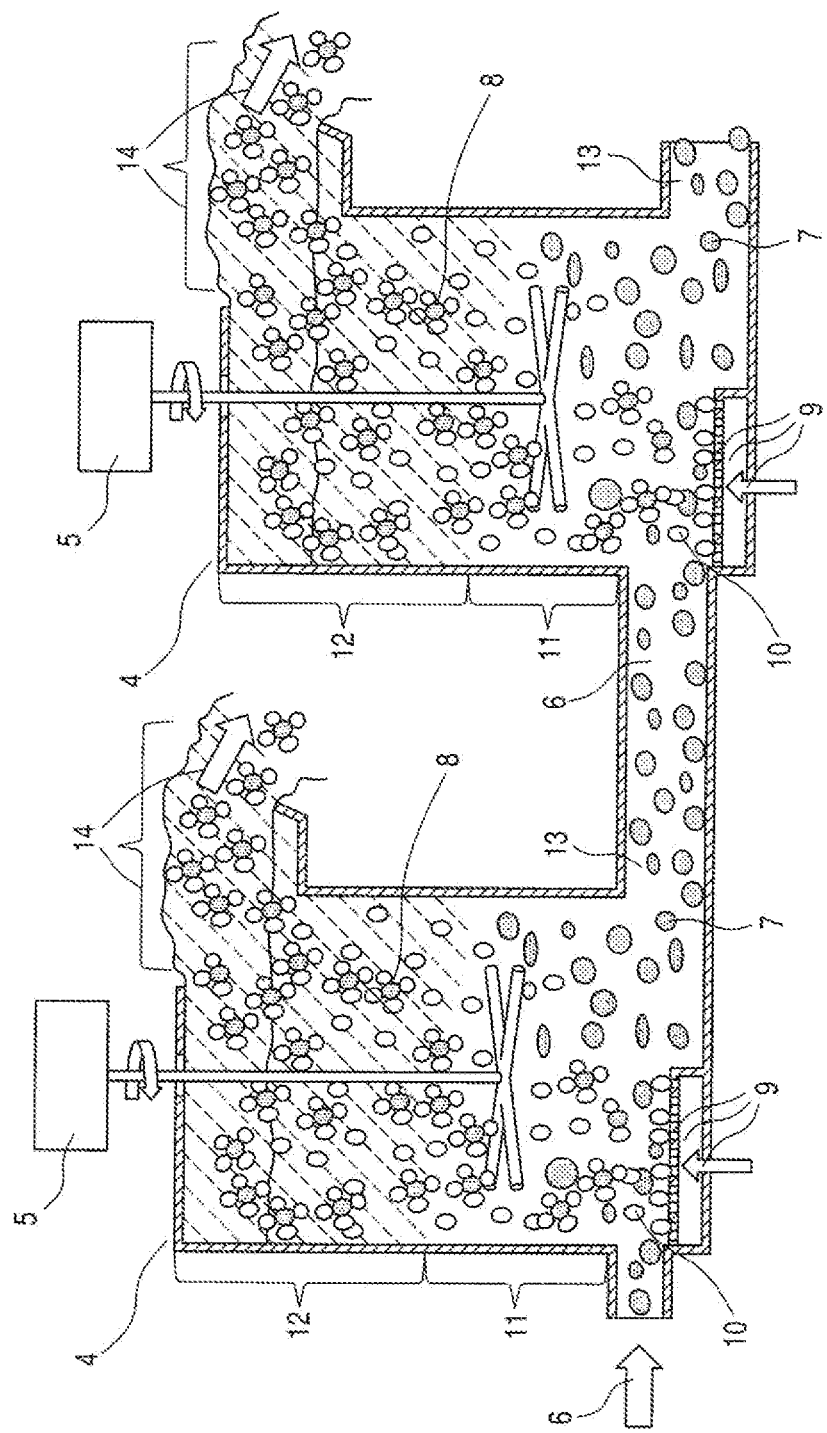

A granulated whole utility vehicle tire material available on the market, comprising natural rubber and butyl/halobutyl rubber and having a particle size of 2 to 4 mm, was processed in a flotation cell 15 according to FIG. 6. In a flotation cell 15 of capacity several liters, it was possible to separate the granulated used tire material 16 by introduction of a vigorous air-containing water jet 17 with good mixing of the air in the water (injection). In the course of this, air bubbles accumulated on the natural rubber-containing granulated material 18, and it was floated out through the overflow 19 with the water leaving at the top and collected in a screening system 20. The butyl rubber-containing granulated material 21 remained in the flotation cell 15 at the bottom, and was discharged from there, according to the amount thereof, via a pipe with flow gate 22. The water 23 running off through the screen 20 was collected in a tank and reused as process water for injection.

This simple flotation process has the advantage over a flotation process using foamers as a discharge medium for the granulated natural rubber material that the flotation water can be circulated. This enables a low-water flotation process which considerably conserves water, which is a natural resource.

In the two tests, purified natural rubber and butyl/halobutyl granulated rubber materials were obtained, which, after regeneration processes, can be metered as a high-value material into rubber mixtures, for example for treads or innerliners of pneumatic motor vehicle tires.

It is understood that the foregoing description is that of the preferred embodiments of the invention and that various changes and modifications may be made thereto without departing from the spirit and scope of the invention as defined in the appended claims.

LIST OF REFERENCE NUMERALS

1 Granulated used tire particles
2 Air bubbles
3 Suspension medium
4 Flotation cell
5 Stirrer
6 Pipe
7 Granulated whole tire material which does not accumulate any air bubbles
8 Granulated whole tire material which accumulates air bubbles
9 Perlator
10 Air bubbles
11 Bubble accumulation zone
12 Zone of foam formation
13 Pipe
14 Exit region
15 Flotation cell
16 Granulated used tire material
17 Air-containing water jet
18 Granulated natural rubber-containing material
19 Overflow
20 Screening system.
21 Granulated butyl rubber-containing material
22 Pipe with flow gate
23 Water runoff

What is claimed is:

1. A method for processing a mixture of particles of natural rubber and at least one of a butyl rubber and a halobutyl rubber, the method comprising:
   providing the mixture of particles as a granulated rubber or as a powdered rubber;
   suspending the mixture of particles in a liquid to form a suspension;
   optionally, adding a flotation agent to the suspension;
   injecting a gas into the suspension;
   stirring the suspension with a stirrer; and,
   separating the natural rubber from the at least one of the butyl rubber and the halobutyl rubber by flotation based on a difference in surface wettability of the particles.

2. The method as claimed in claim 1, further comprising obtaining the granulated rubber or powdered rubber by comminuting whole used tires.

3. The method as claimed in claim 2, further comprising obtaining the granulated rubber or powdered rubber by comminuting whole used utility vehicle tires.

4. The method as claimed in claim 1, wherein the granulated rubber or powdered rubber has a particle size of 50 to 3 mesh.

5. The method as claimed in claim 1, wherein the separating is effected in at least one flotation cell.

6. The method as claimed in claim 5, wherein the separating is effected in a plurality of flotation cells connected in series.

7. The method as claimed in claim 1, wherein the liquid is water.

8. The method as claimed in claim 1, wherein air is injected into the suspension.

9. The method as claimed in claim 1, further comprising drying the separated particles of different rubber types to obtain processed and dried granulated rubber or powdered rubber.

10. The method as claimed in claim 9, wherein the processed and dried granulated rubber or powdered rubber is regenerated.

11. The method as claimed in claim 9, further comprising adding the processed and dried granulated rubber or powdered rubber as an aggregate to a rubber mixture.

12. The method as claimed in claim 11, wherein the rubber mixture is a tire rubber mixture.

* * * * *

UNITED STATES PATENT AND TRADEMARK OFFICE
CERTIFICATE OF CORRECTION

PATENT NO. : 9,221,060 B2
APPLICATION NO. : 13/857015
DATED : December 29, 2015
INVENTOR(S) : Martin Theusner It is certified that error appears in the above-identified patent and that said Letters Patent is hereby corrected as shown below:

In the Specification

In Column 3:
Line 37: delete "BP" and substitute -- EP -- therefor.
Line 47: delete "wore" and substitute -- more -- therefor.

In Column 4:
Line 2: delete "ail" and substitute -- all -- therefor.
Line 45: delete "an" and substitute -- on -- therefor.
Line 60: delete "interracial" and substitute -- interfacial -- therefor.

In Column 5:
Line 37: delete "produces" and substitute -- products -- therefor.

In Column 7:
Line 1: delete "IS" and substitute -- IR -- therefor.

Signed and Sealed this
Eighth Day of March, 2016

Michelle K. Lee
*Director of the United States Patent and Trademark Office*